US009667657B2

United States Patent
Efremov et al.

(10) Patent No.: US 9,667,657 B2
(45) Date of Patent: May 30, 2017

(54) SYSTEM AND METHOD OF UTILIZING A DEDICATED COMPUTER SECURITY SERVICE

(71) Applicant: AO Kaspersky Lab, Moscow (RU)

(72) Inventors: Andrey A. Efremov, Moscow (RU); Anton S. Lapushkin, Moscow (RU)

(73) Assignee: AO Kaspersky Lab, Moscow (RU)

( * ) Notice: Subject to any disclaimer, the term of this patent is extended or adjusted under 35 U.S.C. 154(b) by 0 days.

(21) Appl. No.: 14/817,394

(22) Filed: Aug. 4, 2015

(65) Prior Publication Data

US 2017/0041342 A1    Feb. 9, 2017

(51) Int. Cl.
| | |
|---|---|
| *H04L 29/06* | (2006.01) |
| *H04L 29/08* | (2006.01) |
| *G06F 21/56* | (2013.01) |
| *G06F 17/30* | (2006.01) |

(52) U.S. Cl.
CPC ........ *H04L 63/20* (2013.01); *G06F 17/30312* (2013.01); *G06F 21/56* (2013.01); *H04L 63/205* (2013.01); *H04L 67/10* (2013.01); *H04L 67/1008* (2013.01); *H04L 67/1097* (2013.01)

(58) Field of Classification Search
CPC .... H04L 63/20; H04L 67/10; G06F 17/30312
USPC .................. 726/22, 23, 25, 1, 4, 5, 7, 8, 10
See application file for complete search history.

(56) References Cited

U.S. PATENT DOCUMENTS

| | | | |
|---|---|---|---|
| 7,640,589 B1 | 12/2009 | Mashevsky et al. | |
| 8,276,202 B1 * | 9/2012 | Dubrovsky | H04L 63/0245 380/30 |
| 8,429,716 B2 * | 4/2013 | Earl | H04L 9/32 726/3 |
| 8,479,263 B1 * | 7/2013 | Liu | H04L 63/0869 726/3 |
| 8,695,059 B2 * | 4/2014 | Kopti | H04L 63/20 726/1 |
| 8,713,628 B2 * | 4/2014 | Kopti | H04L 51/14 726/1 |
| 8,732,472 B2 | 5/2014 | Grebennikov et al. | |
| 8,732,836 B2 | 5/2014 | Romanenko et al. | |

(Continued)

FOREIGN PATENT DOCUMENTS

WO    WO 2007068717 A1 *  6/2007 ......... H04L 67/2814

OTHER PUBLICATIONS

Oberheide et al., CloudAV: N-Version Antivirus in the Network Cloud, ACM, 2008.*

(Continued)

*Primary Examiner* — David García Cervetti
(74) *Attorney, Agent, or Firm* — Arent Fox LLP; Michael Fainberg

(57) ABSTRACT

Disclosed are systems and method for utilizing a dedicated computer security service. An exemplary method includes storing in an electronic database rules that indicate when to use either a first cloud service or a second cloud service for one of the security services, receiving a request from a client computer to access the security service, determining parameters relating to the received request, applying the parameters to the plurality of rules to determine an instruction indicating whether to transmit the request to the first cloud service or the second cloud service; and transmitting the request to either the first cloud service or the second cloud service, based on the instruction, to use the at least one security service.

18 Claims, 6 Drawing Sheets

(56) References Cited

U.S. PATENT DOCUMENTS

| | | | |
|---|---|---|---|
| 8,738,721 B1 | 5/2014 | Smirnov et al. | |
| 8,799,641 B1* | 8/2014 | Seidenberg | H04L 63/0876 713/153 |
| 8,813,174 B1 | 8/2014 | Koeten et al. | |
| 8,892,766 B1* | 11/2014 | Wei | H04L 63/1408 706/22 |
| 8,914,406 B1* | 12/2014 | Haugsnes | H04L 63/1441 382/305 |
| 9,087,189 B1* | 7/2015 | Koeten | H04L 41/022 |
| 9,104,672 B2* | 8/2015 | Beaty | H04L 43/0817 |
| 9,110,976 B2* | 8/2015 | Bolgert | G06F 11/3006 |
| 9,118,685 B1* | 8/2015 | Brocco | H04L 63/102 |
| 9,129,086 B2* | 9/2015 | Betz | G06F 21/00 |
| 9,152,789 B2* | 10/2015 | Natarajan | H04L 63/1416 |
| 9,172,766 B2* | 10/2015 | Narasimhan | H04L 41/046 |
| 9,319,411 B2* | 4/2016 | Wharton | H04L 63/10 |
| 2004/0088409 A1* | 5/2004 | Braemer | H04L 63/0209 709/225 |
| 2005/0094637 A1* | 5/2005 | Umesawa | H04L 41/0893 370/389 |
| 2006/0288405 A1* | 12/2006 | Albisu | G06F 21/34 726/8 |
| 2008/0141027 A1* | 6/2008 | Kim | H04L 9/3218 713/156 |
| 2008/0228772 A1* | 9/2008 | Plamondon | G06F 17/30902 |
| 2008/0228864 A1* | 9/2008 | Plamondon | G06F 17/30902 709/203 |
| 2008/0228938 A1* | 9/2008 | Plamondon | H04L 12/4641 709/233 |
| 2008/0229017 A1* | 9/2008 | Plamondon | H04L 67/2847 711/118 |
| 2008/0229020 A1* | 9/2008 | Plamondon | G06F 12/0813 711/122 |
| 2008/0273520 A1* | 11/2008 | Kim | H04L 12/5695 370/345 |
| 2008/0289019 A1* | 11/2008 | Lam | G06F 21/41 726/9 |
| 2009/0017815 A1* | 1/2009 | Takeda | H04L 47/10 455/422.1 |
| 2010/0125903 A1* | 5/2010 | Devarajan | G06F 21/577 726/15 |
| 2010/0223364 A1* | 9/2010 | Wei | H04L 29/04 709/220 |
| 2010/0251329 A1* | 9/2010 | Wei | H04L 63/1408 726/1 |
| 2011/0022642 A1* | 1/2011 | deMilo | G06F 17/30082 707/805 |
| 2011/0138034 A1* | 6/2011 | Brookbanks | H04L 41/5009 709/224 |
| 2011/0138050 A1* | 6/2011 | Dawson | G06F 9/5072 709/226 |
| 2011/0145413 A1* | 6/2011 | Dawson | G06Q 40/025 709/226 |
| 2011/0145580 A1* | 6/2011 | Auradkar | H04L 63/0428 713/170 |
| 2011/0153721 A1* | 6/2011 | Agarwal | H04L 69/16 709/203 |
| 2011/0225647 A1* | 9/2011 | Dilley | H04L 63/0218 726/14 |
| 2011/0296022 A1* | 12/2011 | Ferris | G06F 9/5072 709/226 |
| 2012/0005264 A1* | 1/2012 | McWhirter | G06F 9/5061 709/203 |
| 2012/0023090 A1* | 1/2012 | Holloway | H04L 63/0281 707/709 |
| 2012/0047107 A1* | 2/2012 | Doddavula | G06F 17/30575 707/620 |
| 2012/0151057 A1* | 6/2012 | Paredes | H04L 12/4641 709/225 |
| 2012/0173759 A1* | 7/2012 | Agarwal | H04L 67/2814 709/241 |
| 2012/0204219 A1* | 8/2012 | Kopti | G06F 21/567 726/1 |
| 2012/0210417 A1* | 8/2012 | Shieh | H04L 63/0218 726/12 |
| 2012/0215898 A1 | 8/2012 | Shah et al. | |
| 2012/0240233 A1* | 9/2012 | Loman | G06F 21/51 726/24 |
| 2012/0258777 A1* | 10/2012 | Huang | H04W 4/003 455/557 |
| 2013/0024919 A1* | 1/2013 | Wetter | G06F 21/335 726/6 |
| 2013/0031224 A1* | 1/2013 | Nachtrab | G06F 9/5072 709/220 |
| 2013/0061325 A1* | 3/2013 | Singh | H04L 63/145 726/24 |
| 2013/0067090 A1 | 3/2013 | Batrouni et al. | |
| 2013/0080623 A1* | 3/2013 | Thireault | G06F 9/5027 709/224 |
| 2013/0103834 A1* | 4/2013 | Dzerve | H04L 67/10 709/225 |
| 2013/0179676 A1* | 7/2013 | Hamid | H04L 9/08 713/150 |
| 2013/0204849 A1* | 8/2013 | Chacko | G06F 3/0604 707/692 |
| 2013/0205361 A1* | 8/2013 | Narayanaswamy | H04W 12/12 726/1 |
| 2013/0219164 A1* | 8/2013 | Hamid | H04L 63/0485 713/150 |
| 2013/0219171 A1* | 8/2013 | Gearhart | H04L 9/00 713/153 |
| 2013/0219175 A1* | 8/2013 | Gearhart | H04L 63/0485 713/160 |
| 2013/0247134 A1* | 9/2013 | Puttaswamy Naga | H04L 63/20 726/1 |
| 2013/0262851 A1* | 10/2013 | Hirvonen | H04L 63/123 713/150 |
| 2013/0272199 A1* | 10/2013 | Agiwal | H04W 72/0406 370/328 |
| 2013/0318593 A1* | 11/2013 | Smith | H04L 63/08 726/9 |
| 2013/0324104 A1* | 12/2013 | Cavilla | H04W 72/1242 455/422.1 |
| 2013/0326516 A1* | 12/2013 | Hill | G06F 9/45533 718/1 |
| 2013/0347110 A1* | 12/2013 | Dalal | G06F 13/16 726/23 |
| 2014/0006354 A1* | 1/2014 | Parkison | G06F 17/30194 707/649 |
| 2014/0006580 A1* | 1/2014 | Raghu | G06F 9/5072 709/223 |
| 2014/0006581 A1* | 1/2014 | Raghu | G06F 9/5072 709/223 |
| 2014/0007239 A1* | 1/2014 | Sharpe | G06F 21/561 726/24 |
| 2014/0019415 A1 | 1/2014 | Barker et al. | |
| 2014/0026191 A1* | 1/2014 | Jain | G06F 21/6218 726/4 |
| 2014/0050317 A1* | 2/2014 | Sabin | H04L 9/08 380/44 |
| 2014/0082131 A1* | 3/2014 | Jagtap | G06F 9/5072 709/217 |
| 2014/0082156 A1* | 3/2014 | Jagtap | G06F 9/5027 709/220 |
| 2014/0089526 A1* | 3/2014 | Schmidt | H04L 12/6418 709/249 |
| 2014/0096241 A1* | 4/2014 | Li | H04L 63/12 726/22 |
| 2014/0101225 A1 | 4/2014 | Abu-Libdeh et al. | |
| 2014/0101308 A1* | 4/2014 | Wanser | H04L 43/08 709/224 |
| 2014/0105103 A1* | 4/2014 | Nethi | H04W 12/02 370/328 |
| 2014/0130161 A1* | 5/2014 | Golovanov | G06F 21/564 726/23 |
| 2014/0137244 A1* | 5/2014 | Banerjee | G06F 21/52 726/22 |

(56) References Cited

U.S. PATENT DOCUMENTS

| | | | |
|---|---|---|---|
| 2014/0142984 A1* | 5/2014 | Wright | G06F 19/321 705/3 |
| 2014/0149495 A1* | 5/2014 | Chiu | H04L 67/06 709/203 |
| 2014/0157397 A1* | 6/2014 | Dalal | G06F 13/1652 726/13 |
| 2014/0181966 A1* | 6/2014 | Carney | H04L 63/1458 726/22 |
| 2014/0215590 A1* | 7/2014 | Brand | H04L 67/1097 726/6 |
| 2014/0223576 A1* | 8/2014 | Zhao | H04L 63/10 726/27 |
| 2014/0230073 A1* | 8/2014 | Liang | H04N 21/42623 726/27 |
| 2014/0250491 A1* | 9/2014 | Fleischman | H04L 63/20 726/1 |
| 2014/0304818 A1* | 10/2014 | Li | G06F 21/568 726/24 |
| 2014/0317684 A1* | 10/2014 | Porras | H04L 63/20 726/1 |
| 2014/0325600 A1 | 10/2014 | Odenheimer | |
| 2014/0334495 A1* | 11/2014 | Stubberfield | H04L 49/354 370/401 |
| 2015/0007263 A1* | 1/2015 | Stewart | H04L 63/0815 726/3 |
| 2015/0007324 A1* | 1/2015 | Ngair | H04L 63/145 726/24 |
| 2015/0020203 A1* | 1/2015 | Xie | G06F 21/56 726/24 |
| 2015/0026756 A1* | 1/2015 | Reddy | H04W 12/08 726/1 |
| 2015/0026757 A1* | 1/2015 | Reddy | H04L 63/10 726/1 |
| 2015/0033305 A1* | 1/2015 | Shear | G06F 21/45 726/6 |
| 2015/0052247 A1 | 2/2015 | Threefoot et al. | |
| 2015/0067171 A1* | 3/2015 | Yum | H04L 67/2809 709/226 |
| 2015/0106881 A1* | 4/2015 | Wharton | H04L 63/08 726/4 |
| 2015/0121449 A1* | 4/2015 | Cp | H04L 63/145 726/1 |
| 2015/0128205 A1* | 5/2015 | Mahaffey | H04L 63/20 726/1 |
| 2015/0143504 A1* | 5/2015 | Desai | H04L 45/14 726/13 |
| 2015/0149657 A1* | 5/2015 | Reddy | H04L 45/72 709/242 |
| 2015/0150124 A1* | 5/2015 | Zhang | H04L 63/1408 726/22 |
| 2015/0163199 A1* | 6/2015 | Kailash | H04L 63/0209 726/11 |
| 2015/0188939 A1* | 7/2015 | Chen | H04L 63/00 726/25 |
| 2015/0188949 A1* | 7/2015 | Mahaffey | H04L 63/20 726/1 |
| 2015/0222656 A1* | 8/2015 | Haugsnes | H04L 63/1441 726/23 |
| 2015/0242631 A1* | 8/2015 | Cabrera | G06F 21/577 726/25 |
| 2015/0242634 A1* | 8/2015 | Lietz | G06F 21/577 726/25 |
| 2015/0244781 A1* | 8/2015 | Agarwal | H04L 69/16 709/203 |
| 2015/0281046 A1* | 10/2015 | Bitar | H04L 45/308 709/203 |
| 2015/0281233 A1* | 10/2015 | Asenjo | G06F 21/44 726/7 |
| 2015/0312188 A1* | 10/2015 | White | H04L 51/04 709/204 |
| 2015/0350341 A1* | 12/2015 | Daute | H04L 67/1004 714/38.1 |
| 2015/0373004 A1* | 12/2015 | Hopkins | H04L 63/08 726/6 |
| 2015/0373012 A1* | 12/2015 | Bartz | H04L 63/0823 726/7 |
| 2016/0014159 A1* | 1/2016 | Schrecker | H04L 63/0869 726/1 |
| 2016/0028688 A1* | 1/2016 | Chizhov | G06Q 10/10 726/12 |
| 2016/0072894 A1* | 3/2016 | Mishra | H04L 41/5054 709/226 |
| 2016/0119289 A1* | 4/2016 | Jain | H04L 63/0281 726/12 |
| 2016/0308762 A1* | 10/2016 | Teng | H04L 45/50 |

OTHER PUBLICATIONS

Lakshmi Subramanian, Security as a Service in Cloud for Smartphones, KTH Sweden, Jun. 2011.*
Barkhatova Tatiana Valentinovna Improvement of Tourism Information System on the Basis of Cloud Computing Technology Almanac of Modern Science and Education Tambov: Diploma, 2014. N2 2 (81). C. 15-18. ISSN 1993-5552.
Getov:"Security as a Service in Smart Clouds-Opportunities and Concerns", Computer Software and Applications Conference, 2012 IEEE 36th Annual, IEEE, Jul. 16, 2012, pp. 373-379, XO032472770, DOI 10.1109/COMPSAC.2012.112 ISBN: 978-1-4673-1990-4.
Jarabek et al.: ThinAV, 20121203-20121207, Dec. 3, 2012 pp. 209-213, XP058010683, DOI 10.1145/2420950.2420983 ISBN: 978-1-4503-1312-4.
Shahid Alam et al.: "In-CLoud Malware Analysis and Detection" Security of Information and Networks, ACM, 2 Penn Plaza Suite 701, NY, NY, 10121, Sep. 9, 2014, pp. 473-478, XP058062551, DOI 10.1145/2659651.2659730; ISBN 978-1-4503-3033-6.

* cited by examiner

SYSTEM AND METHOD OF UTILIZING A DEDICATED COMPUTER SECURITY SERVICE

FIELD OF TECHNOLOGY

The present disclosure relates generally to the field of computer security, and, more particularly, to a system and method of utilizing a dedicated computer security service.

BACKGROUND

Currently, so-called "cloud" technologies are becoming increasingly popular. Cloud technologies provide remote access to computing resources or data without substantial expense for the computer infrastructure of a company (i.e., the client of the cloud technology service). Typically, the client only needs to have a constant Internet connection to gain access to a cloud service. In general, there are several types of cloud services—private cloud services, public cloud services, and a hybrid of the two. A private cloud service is designed for a particular company or group of persons and essentially constitutes a dedicated network with resources, whereas a public cloud service provides access to its resources to all connected clients. A hybrid cloud service combines both of these approaches and enables a more flexible construction of the computer infrastructure of a company.

Not surprisingly, companies that produce antivirus software are also interested in cloud technologies. In particular, due to the growth in the number of malicious programs and the techniques for their distribution, the need has arisen for a new approach to protect users other than the constant releasing of antivirus databases, which, in turn, are not insured against possible mistakes due to inadequate testing time, as well as due to the possibility of the companies producing antivirus solutions concealing the decision making (i.e. malware detection) logic in the cloud service.

One of the examples of cloud technologies in the field of computer security is Kaspersky Security Network (KSN). Very generally stated, the algorithm of its operation is as follows: the user sends a request to a cloud service to check an unknown file or link and receives a reply in the form of a "safe" verdict or "dangerous" verdict. In practice, the technology is much more complicated than this example, and its various implementations have been described in U.S. Pat. Nos. 7,640,589 and 8,732,836, for example, both of which are also assigned to the assignee of this application.

Cloud technologies also have a drawback due to the fact that when the technologies are used in corporate networks, data may be involved (e.g., data on an unknown file, such as digital signature, size, title, and the like) whose use/access by a third party might be forbidden. As a result, the network administrator may prevent the transmission of such data and/or refuse the use of such a technology, since it may run counter to confidentiality policies existing in the organization, also known as DLP ("Data Leak Prevention") policies.

In light of such an issue, there are certain proposed solutions to make data anonymous or for a more flexible setup of a cloud service. For example, in one proposed solution, data can be anonymously transmitted, such that the service can be set up for a particular user. Moreover, in order to make use of antivirus cloud technologies, it is important to preserve a balance between the level of detection of malicious programs and attacks (i.e., the quality of the antivirus services provided) and the level of compliance with secrecy (i.e., privacy) involving the checking of the data being sent.

Analyzing the existing solutions reveals that these technologies are often ineffective and, in certain circumstances, unusable.

SUMMARY

The disclosed system and method pertains to antivirus technologies, and, more specifically, to a system and method of utilizing a dedicated computer security service. Advantageously, the disclosed system and method can prevent the transmission of confidential data of a client company that is using the security cloud services of a company providing computer security services. Another technical result of the disclosed system and method is the reduction of the volume of data of the client company using the security cloud services of the company providing computer security services that is being sent via the Internet. According to one of the example aspects disclosed herein, a system and method is provided for redirecting a request from the user's computer to a public or private cloud service, where the user's computer is located within the network of a company which uses both a public and private cloud service.

According to one aspect, a method is provided for utilizing computer security services. According to the exemplary aspect, the method includes storing, in an electronic database, a plurality of rules that indicate when to use either a first cloud service or a second cloud service for at least one of the security services; receiving a request from a client computer to access the at least one security service; determining, by a hardware processor, at least one parameter relating to the received request; applying, by the hardware processor, the at least one parameter to the plurality of rules to determine an instruction indicating whether to transmit the request to the first cloud service or the second cloud service; and transmitting the request to one of either the first cloud service or the second cloud service, based on the instruction, to use the at least one security service.

According to another aspect, the method further includes performing, by the one of the first cloud service and the second cloud service, the at least on security service on the request; and transmitting, by the one of the first cloud service and the second cloud service, an operation instruction to the client based on a result of the performed at least one security service.

According to another aspect, the first cloud service is a private cloud service and the second cloud service is a public cloud service.

According to another aspect, the request from the client computer to access the at least one security service does not include an indication of whether to transmit the request to the first cloud service or the second cloud service.

According to another aspect, the request is initially transmitted to first cloud service and redirected to second cloud service based on the instruction determined by the hardware processor.

According to another aspect, the storing of the plurality of rules comprises storing rules relating to at least one of a predetermined time period when software of the first cloud service was last updated, a type of the at least one security service provided by the first cloud service, a type of data being sent by the request, a traffic quota of an amount of requests sent to at least one of the first or second cloud services.

According to another aspect, the determining of the at least one parameter relating to the received request comprises determining at least one of a type of the at least one security service being accessed by the request, a type of file included in the request, a type of link included in the request the request, and a hash sum included in the request.

According to an exemplary aspect, a system is provided for utilizing computer security services. According to the exemplary aspect, the system includes an electronic database configured to store a plurality of rules that indicate when to use either a first cloud service or a second cloud service for at least one of the security services; and a hardware processor configured to receive a request from a client computer to access the at least one security service, determine at least one parameter relating to the received request, apply the at least one parameter to the plurality of rules to determine an instruction indicating whether to transmit the request to the first cloud service or the second cloud service, and transmit the request to one of either the first cloud service or the second cloud service, based on the instruction, to use the at least one security service.

According to another aspect, a non-transitory computer readable medium storing computer executable instructions is provided for utilizing computer security services. According to the exemplary aspect, the medium includes instructions for storing, in an electronic database, a plurality of rules that indicate when to use either a first cloud service or a second cloud service for at least one of the security services; receiving a request from a client computer to access the at least one security service; determining at least one parameter relating to the received request; applying the at least one parameter to the plurality of rules to determine an instruction indicating whether to transmit the request to the first cloud service or the second cloud service; and transmitting the request to one of either the first cloud service or the second cloud service, based on the instruction, to use the at least one security service.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Example aspects are described herein in the context of a system, method and computer program product for utilizing a dedicated computer security service. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

A company providing computer security services can be considered an antivirus company that provides access to its cloud security services (e.g., AO Kaspersky Lab and the Kaspersky Security Network service). Furthermore, a client company can be a company that uses cloud security services provided by a company providing computer security services. As described above, a public cloud service can be considered a cloud security service that is provided by a company providing computer security services to client companies (for example, Kaspersky Security Network).

Figure 1:
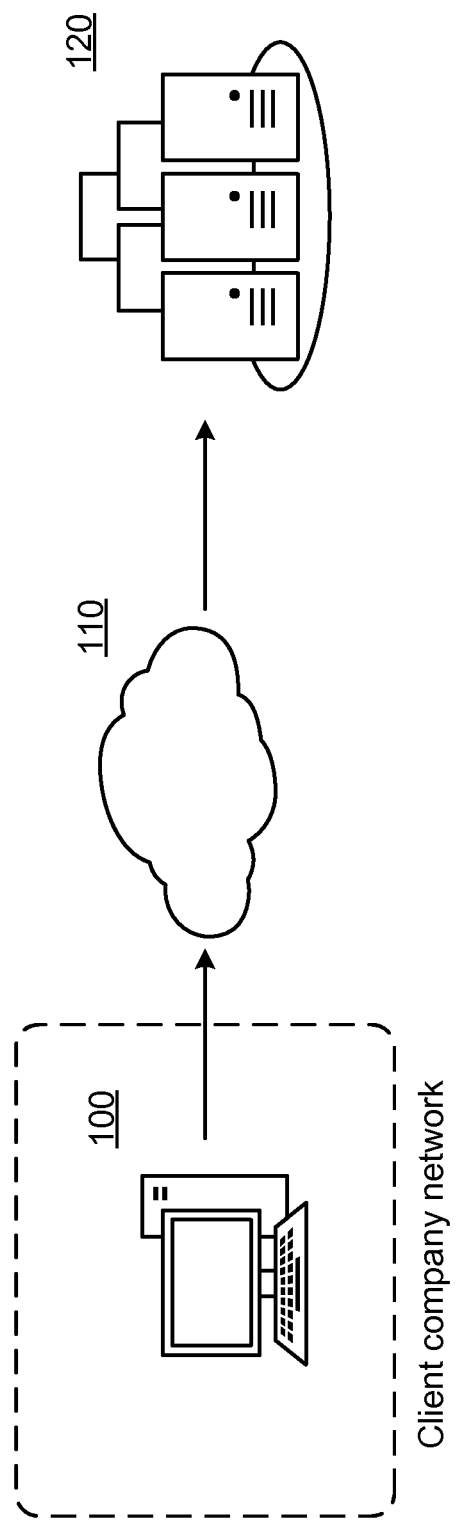
FIG. 1 illustrates an example of the interaction of a computer with a public cloud service of a company providing computer security services (an antivirus company).

FIG. 1 illustrates a block diagram of an exemplary interaction of a computer (located in the network of a client company) with a public cloud service of a company providing computer security services (i.e., an antivirus company). As shown, the antivirus software sends a request from the computer 100 of the user for analysis of an unknown object, which can be a file or a link for example, via the Internet 110 to the public cloud service 120 of an antivirus company. The request is analyzed by internal working logic of the cloud service, and, based on the analysis, a verdict is issued on the object that is sent back to the computer 100, where its antivirus software uses the received verdict for further action on the object. Typically, the verdict will be an indication of whether the object is harmful, but verdicts can also be a rule for the application control operating logic that limits access of programs to the computer resources. An example of such a service is Kaspersky Security Network (KSN). Moreover, as described above, the implementation of the operations of the KSN has been described in U.S. Pat. Nos. 7,640,589 and 8,732,836, for example, the contents of each of which is also incorporated by reference in their entirety.

As noted above, one drawback from using only a public cloud service is that the public cloud can use data that constitutes a possible trade secret or a reference to this, which requires different operating variants of such a service.

Figure 2:
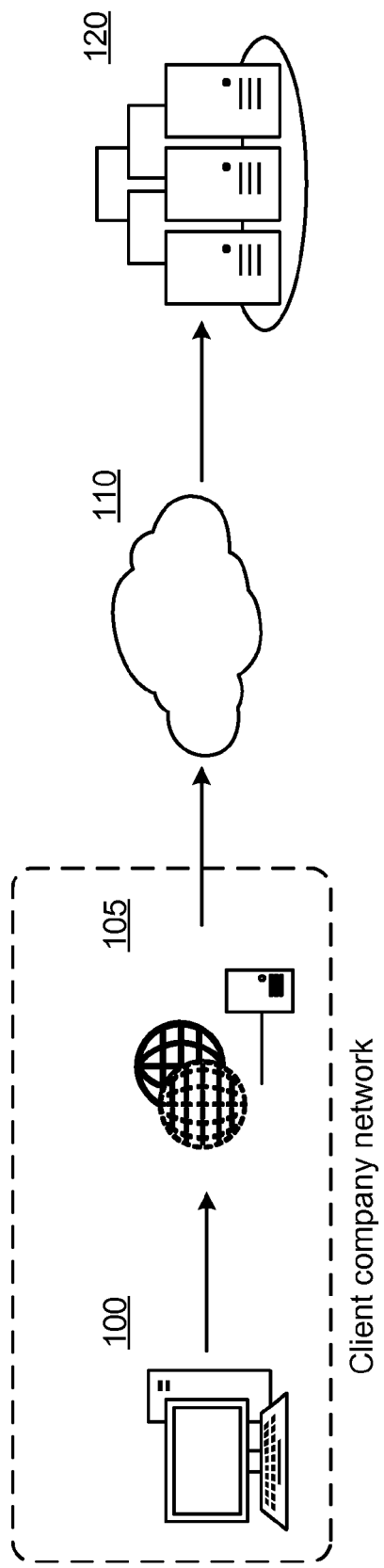
FIG. 2 illustrates a block diagram of an exemplary system for utilizing a dedicated computer security service according to an exemplary aspect.

Accordingly, FIG. 2 illustrates a block diagram of an exemplary system for utilizing a dedicated computer security service according to an exemplary aspect. More particularly, FIG. 2 illustrates the operation of a computer in a network with a private cloud service of a company providing computer security services (e.g., an antivirus company). In the context of the disclosed system and method, as compared to FIG. 1, a private cloud service 105 is provided that is configured to function similar to the public cloud service 120 of the antivirus company. Thus, the company providing computer security services provides the cloud service both in the form of a public cloud service 120 and in the form of a private cloud service 105. In such a case, all requests from the computer 100 are preferably transmitted to the private cloud service 105, which contains all the internal working logic (or at least the most important part for the operation) of the public cloud service 120. Preferably, the link to the public cloud service 120 via the Internet 110 still remains inasmuch as there is a need for continual updating of the logic and data for the operation (e.g., the antivirus databases) of the private cloud service 105 according to an exemplary aspect. However, due to the issue of update delays (related to the testing and distributing of the update), the private cloud service 105 may not have the most current information on threats (generally being the last update of the antivirus databases) in some instances and there is a risk of letting through an unknown malicious program or detecting an executable file of a legitimate application as being harmful (e.g., a false positive detection). Thus, according to the exemplary aspect, both the private and the public cloud service can be utilized for providing the security services as will be explained in more detail below. Advantageously, using a private cloud service 105 is provides a more convenient setup and potentially cheaper cost of use.

Figure 3:
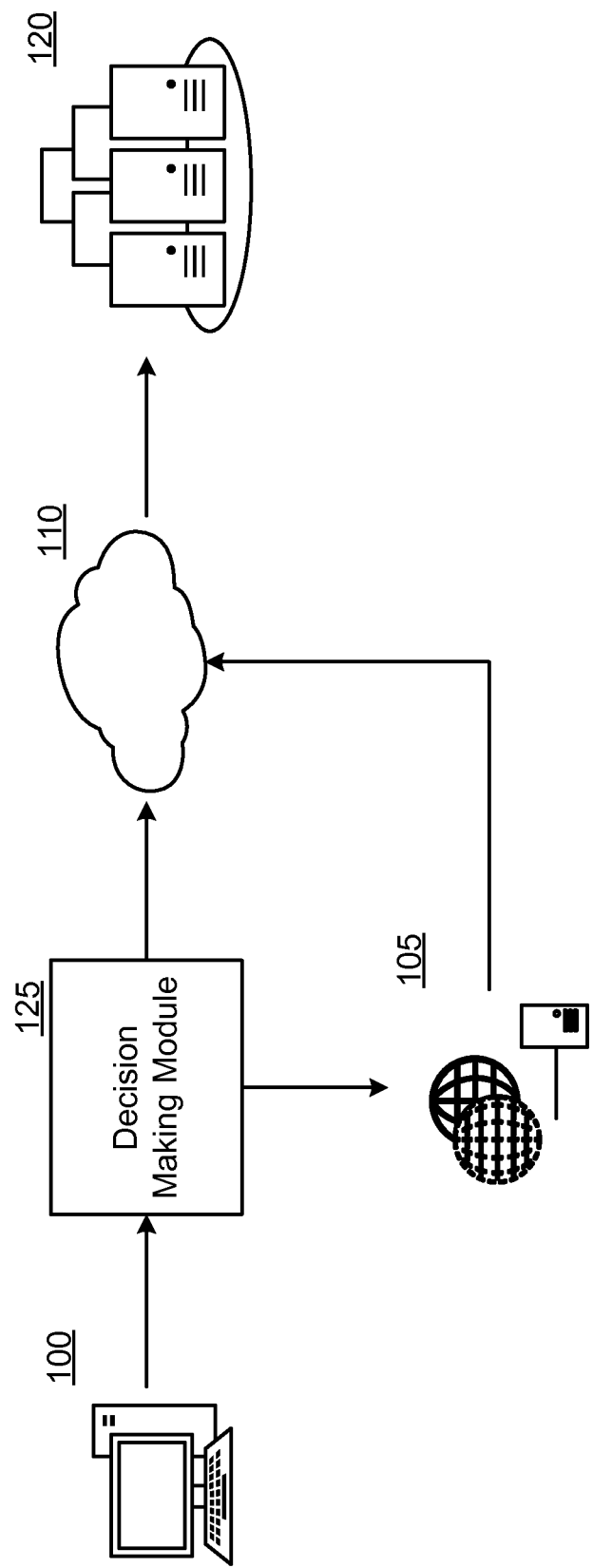
FIG. 3 illustrates a block diagram of an exemplary system for utilizing a dedicated computer security service according to an alternative exemplary aspect.

FIG. 3 illustrates a block diagram of an exemplary system for utilizing a dedicated computer security service according to an alternative exemplary aspect. As shown, FIG. 3 illustrates an exemplary operation of the computer in a network utilizing both a private and public cloud service of a company providing computer security services (e.g., an antivirus company). In contrast to the example of FIG. 2, the exemplary system of FIG. 3 provides a decision making module 125 that is configured to determine where to send the request from the computer 100, i.e., to the private cloud service 105 or to the public cloud service 120.

According to an exemplary aspect, the decision making module 125 can include an electronic database configured to store the established policies indicating which requests should be transmitted to the private cloud service 105 and which requests should be transmitted to the public cloud service 120. As will be described in more detail below, the decision making module 125 can determine one or more parameters of the received request and compare and/or apply these parameters to the established policies to determine the appropriate service to provide the requested security service(s), i.e., the private cloud service 105 or the public cloud service 120.

According to an exemplary aspect, the criteria for selecting the particular cloud service (i.e., either the private or public cloud service) relate to parameters (i.e., cloud service selection policies), that can include, but not limited to, the date of the last update of the private cloud service 105. For example, the more outdated the antivirus databases used by the private cloud service 105, the more likely an unknown malicious program will be missed or an unknown clean file classified as malicious (false positive).

According to another aspect, the criteria to determine whether to transmit the request to either the private cloud service 105 or to the public cloud service 120 can be based on the types of connected services in the private cloud service 105. Although the types of connected services will be discussed more closely in FIG. 4, as an example, a parameter can indicated that the request should be redirected to the public cloud service 120 if the checking of objects of a certain type (e.g., a URL) is not supported within the private cloud service 105.

According to another aspect, the criteria to determine whether to transmit the request to either the private cloud service 105 or to the public cloud service 120 can be the type of data being sent by the request. For example, the transmittal of information on files of a certain format (e.g., having a PDF format) may be forbidden by the confidentiality policy of the client company using both the private cloud service 105 and the public cloud service 120, so that the request to check a similar file will be redirected to the private cloud service 105. Advantageously, the disclosed system and method will prevent the transmittal of confidential data of the client company.

According to yet another aspect, the criteria to determine whether to transmit the request to either the private cloud service 105 or to the public cloud service 120 can be a traffic quota. In this example, if a limitation exists on the volume of data being sent to the public cloud service 120, upon reaching this limit all requests will be redirected to the private cloud service 105. In the context of other variant aspects, the possibility exists of analyzing each request from the computer 100 in terms of the volume of data being sent, upon exceeding which the request is redirected to the private cloud service 105. Advantageously, the disclosed system and method can reduce the volume of data being sent through the Internet, since in the case of the private cloud service 105 the data transmission is done only within the client company.

According to another aspect, the decision making module 125 can also be implemented in the form of a separate client at the computer 100 side or in the form of a proxy server of the antivirus company at the client company's Internet gateway.

Figure 4:
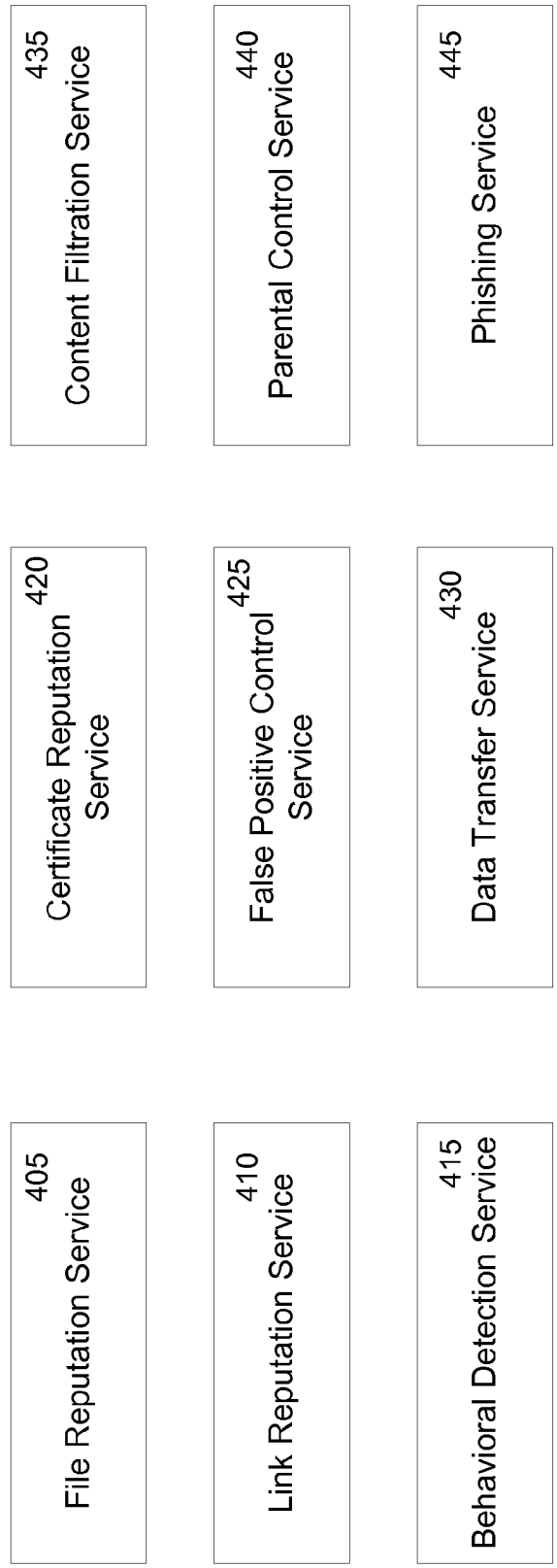
FIG. 4 illustrates an example of the types of connected security services that can be provided by a cloud service according to an exemplary aspect.

FIG. 4 illustrates an example of the types of connected security services that can be provided by a cloud service according to an exemplary aspect. The connected security services can be provided by either the public cloud service 120 and/or the private cloud service 105.

As shown, the connected security services can include a file reputation service 405. The file reputation service 405 is configured to determine whether an unknown file is harmful or not. In one of the exemplary aspects, this service works by comparing the hash sum of the unknown file with the hash sums of known harmful files. In addition, the file category can be determined, if it has been determined to be legitimate (for example, the file may belong to the category of browsers).

The connected security services can further include link reputation service 410, which is configured to determine whether an unknown link (e.g., URL address) is harmful or not. In one of the exemplary aspects, the service works by comparing the hash sum of the unknown link with the hash sums of known harmful links. In another exemplary aspect, either the entire link or its normalized value is compared (e.g., the site address or IP address). In addition, the link category can be determined, if it has been determined to be legitimate (e.g., the link may belong to the category of online shops).

The connected security services can further include behavioral detection service 415, which is configured to determine the harmfulness of an already executing file on the basis of the behavior of a process started from this file. Said process makes calls for system API functions, whose call log can be compared with the call log of already known harmful processes. One exemplary implementation of this service is described in U.S. Pat. No. 8,566,943, the contents of which are hereby incorporated by reference.

The connected security services can further include certificate reputation service 420, which is configured to process certificates of both sites and files in regard to their use by hackers. The implementation includes sending a certificate and its metadata for analysis by a company providing computer security services and as, for example, is described in U.S. Pat. No. 8,732,472, the contents of which are hereby incorporated by reference.

The connected security services can further include false positive control service 425, which is configured to test and revoke antivirus signatures in the event of a false positive as, for example, described in U.S. Pat. No. 8,732,836, the contents of which are hereby incorporated by reference.

The connected security services can further include data transfer service 430, which is configured to transmit files with the use of technologies such as p2p (i.e., "peer-to-peer"), for example.

The connected security services can further include content filtration service 435, which is configured to check email messages for spam. In one aspect, this service is configured to create a hash sum (or a set of hash sums) from an email (or its component parts) for comparison with a cluster of similar hash sums of other email, while a large cluster of identical emails is known as a spam sending. One exemplary implementation of this service is described in U.S. Pat. No. 8,738,721, the contents of which are hereby incorporated by reference.

The connected security services can further include parental control service 440 configured to check the working of a parental control module and phishing service 445 configured to detect possible phishing web pages and links (for example, in a browser).

It should be appreciated that the public cloud service 120 and/or the private cloud service 105 do not necessarily include all of the connected security services according to an exemplary aspect. Moreover, the proposed services operate with various data (i.e. data of various types)—files, links, hash sums of various objects (such as said files or links or the like), and also various metadata from said objects (e.g., size, time of creation, type of object, and the like). According to one exemplary aspect, the administrator of the network where the computer 100 is located can impose various limits on the sending of such data, which means that some services will not work from the public cloud service 120 and will use the private cloud service 105 and vice versa.

Figure 5:
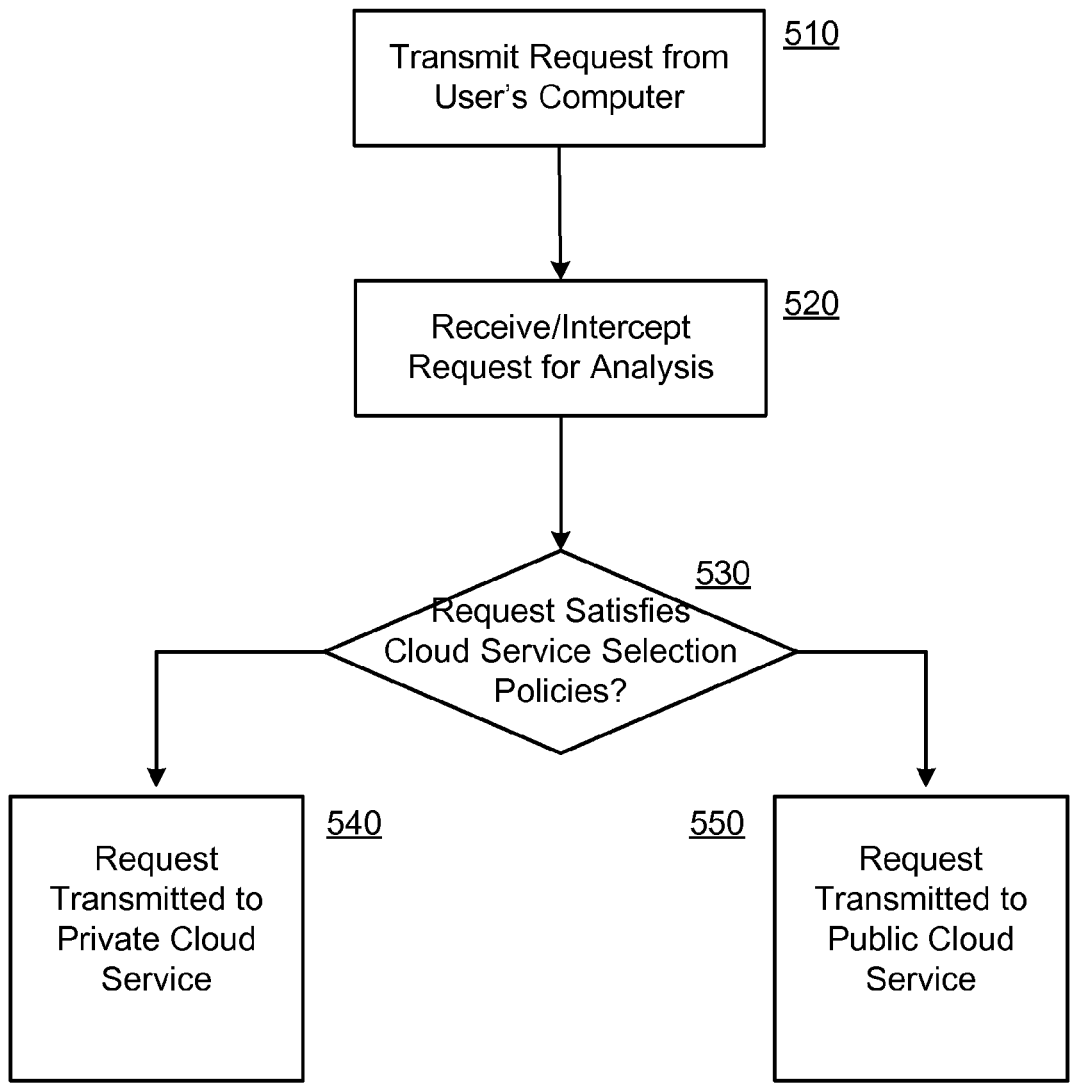
FIG. 5 illustrates a flow chart for a method for utilizing a dedicated computer security service according to an exemplary aspect.

FIG. 5 illustrates a flow chart for a method for utilizing a dedicated computer security service according to an exemplary aspect. As shown, in step 510 a request is transmitted from a computer 100 of a user towards a cloud service to use one or more of the connected security services. According to one aspect, it should be appreciated that there is no information from the computer 100 (more precisely, from the antivirus application installed on the computer 100) as to which service said computer is accessing at the particular time, i.e., the public cloud service 120 or the private cloud service 105. Next, at step 520, the request is received/intercepted by the decision making module 125. In one variant aspect, the decision making module 125 can be implemented in the form of a proxy server of the antivirus company at the client company's Internet gateway. According to yet another exemplary aspect, the decision making module 125 can be provided on the computer 100, and, in this case, there will be logic present to determine which service should be accessed. As step 530, the decision making module 125 determines the parameters of the request, including, for example, which security service the request is accessing, which data (more precisely, the type thereof, such as a file, a link, a hash sum or the like) is being transmitted and/or requested, and checks/applies these one or more parameters against the established policies for selection of the cloud service that are described above in further detail in the context of FIG. 3. If the policies allow a redirecting of the request to the public cloud service 120, then the request is redirected in that direction in step 550 based on an appropriate instruction generated by the decision making module 125. Otherwise, the request is redirected to the private cloud service 105 in step 540 based on an appropriate instruction generated by the decision making module 125.

The following provides three examples of redirected a request to a different service. In a first example, the request from the user's computer 100 contains a type of data being transmitted (e.g., format of the analyzed file is a PDF), and the established policies prohibit this type of file from being sent outside the company by the cloud service selection policies. As a result, the decision making module 125 determines that the request will be retransmitted to the private cloud service 105 for the appropriate security services/requested.

In another example, the decision making module 125 determines that the request from the user's computer 100 exceeds the size of the established quota for data transfer as defined by the cloud service selection policies. As a result, the decision making module 125 determines that the request will be retransmitted to the private cloud service 105 for the appropriate/requested security services.

In another example, the decision making module 125 determines that the request from the user's computer 100 contains a permitted type of data being transmitted (e.g., information on an Internet link), but the updating of the databases of the private cloud service 105 occurred longer than a predetermined amount of time, for example, more than 12 hours ago. In this instance, the decision making module 125 determines that the request will be retransmitted to the public cloud service 120 for the appropriate/requested security services.

Figure 6:
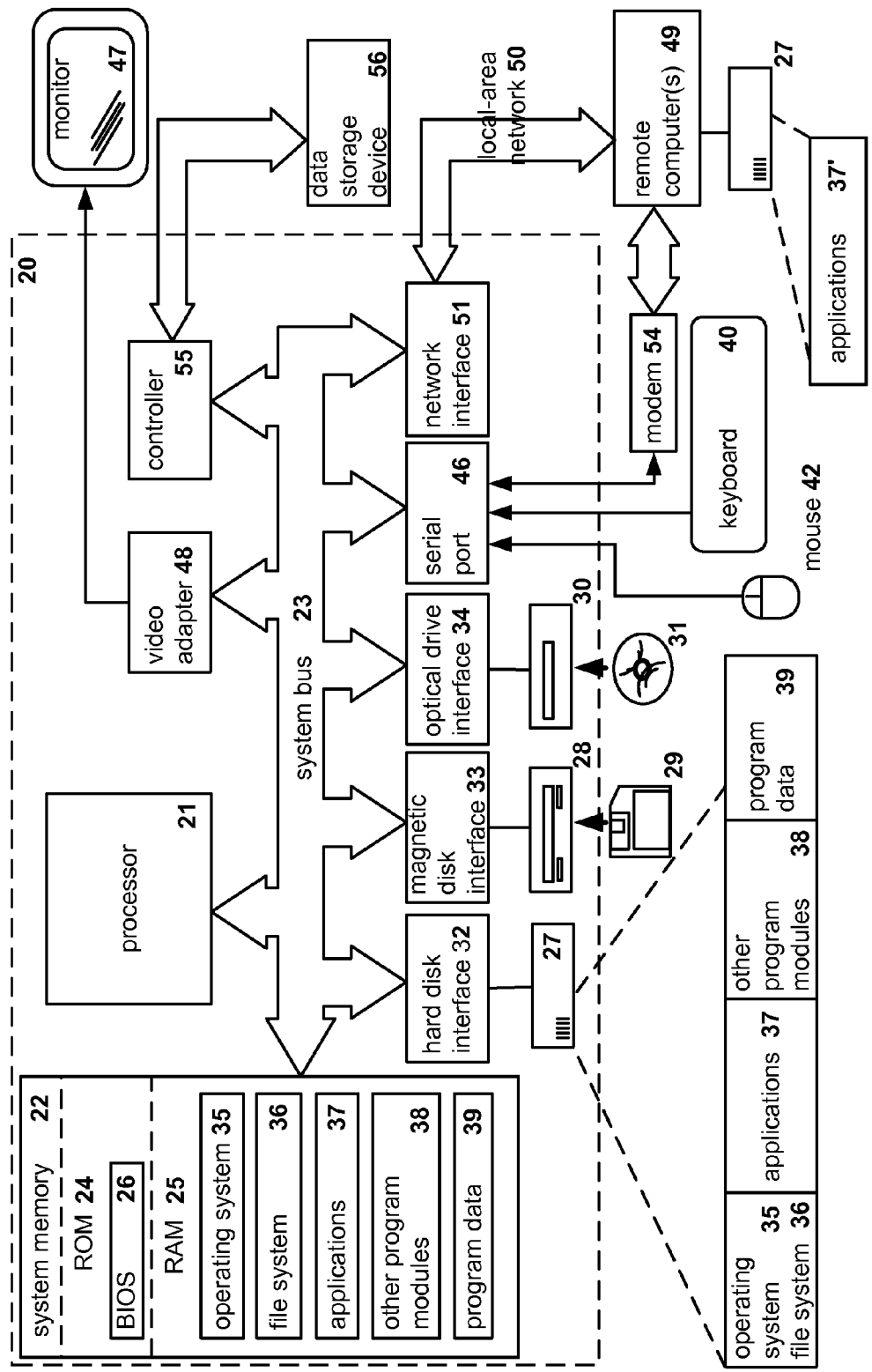
FIG. 6 illustrates an example of a general-purpose computer system on which the disclosed systems and method can be implemented according to an example aspect.

FIG. 6 illustrates an example of a general-purpose computer system (which may be a personal computer or a server) on which the disclosed systems and method can be implemented according to an example aspect. As shown, the computer system includes a central processing unit 21, a system memory 22 and a system bus 23 connecting the various system components, including the memory associated with the central processing unit 21. The system bus 23 is realized like any bus structure known from the prior art, containing in turn a bus memory or bus memory controller, a peripheral bus and a local bus, which is able to interact with any other bus architecture. The system memory includes permanent memory (ROM) 24 and random-access memory (RAM) 25. The basic input/output system (BIOS) 26 includes the basic procedures ensuring the transfer of information between elements of the personal computer 20, such as those at the time of loading the operating system with the use of the ROM 24.

The personal computer 20, in turn, includes a hard disk 27 for reading and writing of data, a magnetic disk drive 28 for reading and writing on removable magnetic disks 29 and an optical drive 30 for reading and writing on removable optical disks 31, such as CD-ROM, DVD-ROM and other optical information media. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are power-independent modules for storage of computer instructions, data structures, program modules and other data of the personal computer 20.

The present disclosure provides the implementation of a system that uses a hard disk 27, a removable magnetic disk 29 and a removable optical disk 31, but it should be understood that it is possible to employ other types of computer information media 56 which are able to store data in a form readable by a computer (solid state drives, flash memory cards, digital disks, random-access memory (RAM) and so on), which are connected to the system bus 23 via the controller 55.

The computer 20 has a file system 36, where the recorded operating system 35 is kept, and also additional program applications 37, other program modules 38 and program data 39. The user is able to enter commands and information into the personal computer 20 by using input devices (keyboard 40, mouse 42). Other input devices (not shown) can be used: microphone, joystick, game controller, scanner, and so on. Such input devices usually plug into the computer system 20 through a serial port 46, which in turn is connected to the system bus, but they can be connected in other ways, for example, with the aid of a parallel port, a game port or a universal serial bus (USB). A monitor 47 or other type of display device is also connected to the system bus 23 across an interface, such as a video adapter 48. In addition to the monitor 47, the personal computer can be equipped with other peripheral output devices (not shown), such as loudspeakers, a printer, and so on.

The personal computer 20 is able to operate in a network environment, using a network connection to one or more remote computers 49. The remote computer (or computers) 49 are also personal computers or servers having the majority or all of the aforementioned elements in describing the nature of a personal computer 20, as shown in FIG. 6. Other devices can also be present in the computer network, such as routers, network stations, peer devices or other network nodes.

Network connections can form a local-area computer network (LAN) 50 and a wide-area computer network (WAN). Such networks are used in corporate computer networks and internal company networks, and they generally have access to the Internet. In LAN or WAN networks, the personal computer 20 is connected to the local-area network 50 across a network adapter or network interface 51. When networks are used, the personal computer 20 can employ a modem 54 or other modules for providing communications with a wide-area computer network such as the Internet. The modem 54, which is an internal or external device, is connected to the system bus 23 by a serial port 46. It should be noted that the network connections are only examples and need not depict the exact configuration of the network, i.e., in reality there are other ways of establishing a connection of one computer to another by technical communication modules.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In various aspects, the systems and methods described in the present disclosure can be addressed in terms of modules. The term "module" as used herein refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module can also be implemented as a combination of the two, with certain functions facilitated by hardware alone, and other functions facilitated by a combination of hardware and software. In certain implementations, at least a portion, and in some cases, all, of a module can be executed on the processor of a general purpose computer (such as the one described in greater detail in FIG. 6 above). Accordingly, each module can be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for utilizing computer security services, the method comprising:
   storing, in an electronic database, a plurality of policies that indicate when to use either a private cloud service or a public cloud service configured to analyze software objects using different types of security services to determine whether the software objects are malicious,
   wherein the policies relate to at least one of: a predetermined time period when software of the private cloud service was last updated, a type of the at least one security service provided by the private cloud service, a type of data being sent in a request to the service, and a traffic quota of requests sent to at least one of the private or public service;

receiving a request from a client computer to access the at least one private or public cloud security service, wherein the request includes an unknown software object;

determining, by a processor, at least one parameter relating to the received request, including at least one of a type of the security service being accessed and a type of the software object included in the request, including one of a file, a link and a hash sum;

applying, by the processor, the at least one parameter to the plurality of policies to determine whether to transmit the request to the private cloud service or the public cloud service; and based on the determination, transmitting the request to one of the private cloud service or the public cloud service.

2. The method of claim 1, wherein
the private cloud service and the public cloud service further configured to the generate application control rules that specify how to process the software objects on the client computer.

3. The method of claim 1, wherein the request from the client computer to access the at least one security service does not include an indication of whether to transmit the request to the private cloud service or the public cloud service.

4. The method of claim 1, wherein the request is initially transmitted to the private cloud service and then redirected to the public cloud service based on a determination made by the processor.

5. The method of claim 1, wherein the security services include one or more of a file reputation service, a link reputation service, a certificate reputation service, a behavioral detection service, a false positive control service, a content filtration service, a phishing service and a parental control service.

6. The method of claim 1, wherein the public cloud service and the private cloud services provide substantially similar security services and have substantially similar internal working logic for the analysis of software objects.

7. A system for utilizing computer security services, the system comprising:
an electronic database configured to store a plurality of policies that indicate when to use either a private cloud service or a public cloud service configured to analyze software objects using different types of security services to determine whether the software objects are malicious,
wherein the policies relate to at least one of: a predetermined time period when software of the private cloud service was last updated, a type of the at least one security service provided by the private cloud service, a type of data being sent in a request to the service, and a traffic quota of requests sent to at least one of the private or public service;
a hardware processor configured to:
  receive a request from a client computer to access the at least one private or public cloud security service, wherein the request includes an unknown software object;
  determine at least one parameter relating to the received request, including at least one of a type of the security service being accessed and a type of the software object included in the request, including one of a file, a link and a hash sum;
  apply the at least one parameter to the plurality of policies to determine whether to transmit the request to the private cloud service or the public cloud service; and
  based on the determination, transmit the request to one of the private cloud service or the public cloud service.

8. The system of claim 7, wherein
the private cloud service and the public cloud service further configured to the generate application control rules that specify how to process the software objects on the client computer.

9. The system of claim 7, wherein the request from the client computer to access the at least one security service does not include an indication of whether to transmit the request to the private cloud service or the public cloud service.

10. The system of claim 7, wherein the request is initially transmitted to the private cloud service and then redirected to the public cloud service based on a determination made by the processor.

11. The system of claim 7, wherein the security services include one or more of a file reputation service, a link reputation service, a certificate reputation service, a behavioral detection service, a false positive control service, a content filtration service, a phishing service and a parental control service.

12. The system of claim 7, wherein the public cloud service and the private cloud services provide substantially similar security services and have substantially similar internal working logic for the analysis of software objects.

13. A non-transitory computer readable medium storing computer executable instructions for utilizing computer security services, including instructions for:
storing, in an electronic database, a plurality of policies that indicate when to use either a private cloud service or a public cloud service configured to analyze software objects using different types of security services to determine whether the software objects are malicious,
wherein the policies relate to at least one of: a predetermined time period when software of the private cloud service was last updated, a type of the at least one security service provided by the private cloud service, a type of data being sent in a request to the service, and a traffic quota of requests sent to at least one of the private or public service;
receiving a request from a client computer to access the at least one private or public cloud security service, wherein the request includes an unknown software object;
determining, by a processor, at least one parameter relating to the received request, including at least one of a type of the security service being accessed and a type of the software object included in the request, including one of a file, a link and a hash sum;
applying, by the processor, the at least one parameter to the plurality of policies to determine whether to transmit the request to the private cloud service or the public cloud service; and
based on the determination, transmitting the request to one of the private cloud service or the public cloud service.

14. The non-transitory computer readable medium of claim 13, wherein the request from the client computer to access the at least one security service does not include an indication of whether to transmit the request to the private cloud service or the public cloud service.

15. The non-transitory computer readable medium of claim 13, wherein the request is initially transmitted to the private cloud service and then redirected to the public cloud service based on a determination made by the processor.

16. The non-transitory computer readable medium of claim 13, wherein the security services include one or more of a file reputation service, a link reputation service, a certificate reputation service, a behavioral detection service, a false positive control service, a content filtration service, a phishing service and a parental control service.

17. The non-transitory computer readable medium of claim 13, wherein the public cloud service and the private cloud services provide substantially similar security services and have substantially similar internal working logic for the analysis of software objects.

18. The non-transitory computer readable medium of claim 13, wherein the private cloud service and the public cloud service further configured to the generate application control rules that specify how to process the software objects on the client computer.

\* \* \* \* \*